US005994800A

United States Patent [19]

[11] Patent Number: 5,994,800

[45] Date of Patent: Nov. 30, 1999

Williams

[54] PRECISION CLAMPING DEVICE WITH DIGITALLY PROGRAMMABLE LOAD

[75] Inventor: James Edgar Williams, Hackettstown, N.J.

[73] Assignee: Lucent Technologies Inc., Murray Hill, N.J.

[21] Appl. No.: 09/074,205

[22] Filed: May 7, 1998

Related U.S. Application Data

[62] Division of application No. 08/711,698, Sep. 20, 1996, Pat. No. 5,810,340.

[51] Int. Cl.$^{6}$ .......... H02K 33/02

[52] U.S. Cl. .......... 310/30; 310/17; 335/259; 269/25; 318/135

[58] Field of Search .......... 310/17, 23, 30, 310/34, 14; 269/25, 329, 20, 23, 27; 335/259; 318/135

[56] References Cited

U.S. PATENT DOCUMENTS

| | | | |
|---|---|---|---|
| 4,076,227 | 2/1978 | Rameson | 269/25 |
| 4,540,965 | 9/1985 | Hattori et al. | 335/269 |
| 5,279,493 | 1/1994 | Halder | 269/329 |
| 5,707,051 | 1/1998 | Tsuji | 269/21 |
| 5,810,340 | 9/1998 | Williams | 269/25 |

*Primary Examiner*—Thomas M. Dougherty
*Assistant Examiner*—Judson H. Jones
*Attorney, Agent, or Firm*—Gibbons, Del Deo , Dolan, Griffinger & Vecchione

[57] ABSTRACT

A linear actuator is used to push a spring-loaded ram The loading force of the spring against a stationary workpiece is calibrated with the displacement of the ram once the load exceeds the spring preset value. At a preset loading position, an electrical contact opens, indicating that the spring load has reached or exceeded the preset value. A mechanical stop, acting in conjunction with the stall characteristics of the linear actuator, prevents the operating range from being exceeded. This device has applications where precise stand-off from a surface, the application of a precise force to that surface, and a controlled rate of the application of the force is needed.

3 Claims, 6 Drawing Sheets

PRECISION CLAMPING DEVICE WITH DIGITALLY PROGRAMMABLE LOAD

This application is a divisional of application Ser. No. 08/711,698, filed on Sep. 20 1996, now U.S. Pat. No. 5,810,340.

BACKGROUND OF THE INVENTION

1. Field of the Invention

This invention relates to clamping devices, and in particular to a spring loaded plunger and ram combination which is moved by a digitally controlled linear actuator.

2. Description of Related Art

Assembly operations in the electronic industry often require the accurate retention of parts relative to one another. Efficient assembly operations also require the rapid movement of clamping tools to retain these parts, yet parts such as optical fibers or semiconductor chips are easily damaged. This damage can occur by the application of an excessive clamping force or even by the rapid impact of a clamp with a limited force. The application of the clamping force must also be controlled so it does not disturb the predetermined location of the part to be clamped. So there are conflicting requirements placed upon clamping devices to increase throughput, work with tighter tolerances, and protect delicate assemblies.

Accordingly, there is a need in the assembly art for a clamping device which is compact, precisely controllable in position, velocity, and force, and one which is strictly limited in the application of the applied force.

SUMMARY OF THE INVENTION

The present invention relates to a digitally controllable clamping device which uses a linear actuator to move a spring loaded plunger. The engagement loads are programmable and controlled and the motion to engage or disengage a delicate part may be limited to a few mils of travel.

In one embodiment of the invention, a housing supports a slidably mounted ram which is reciprocally driven by the shaft of a linear actuator through a coupling. The ram has an aperture, within which a plunger is slidably mounted. The plunger is electrically insulated from the ram by a sliding sleeve and it is biased away from the ram by a spring which fits within an aperture in the plunger. The spring is separated from the ram by an electrical insulator. A plunger stop is supported by the ram and is adapted to make contact with a plunger contact. Wires connected to each of them sense when the plunger experiences a force from the object to be clamped which overcomes a preset force applied by the spring against the ram and the plunger. A controller senses the application of a force incrementally greater than the preset force through the wires and provides drive signals to the linear actuator to continue the advancement of the ram for a predetermined distance which corresponds to the programmed force to be applied to the workpiece.

In another embodiment of the invention, the ram also defines a cup aperture which supports an insulating retainer which captures one end of the spring.

In a further embodiment of the invention a first plunger is slidably supported by the ram and is biased against it by a first spring which is compressed to provide a first preset force. A second plunger is slidably supported by the first plunger and is biased against it by a second spring which is compressed to provide a second preset force which is different from the first preset force. This embodiment places at least one spring in series with another one and provides the advantage of being able to apply a small force on a workpiece and then apply a larger force with less motion than if only one spring was employed.

The invention provides a clamping device which is compact and precisely controllable by the action of a linear actuator which has a resolution of one mil of travel, and which limits the speed, travel, and force applied to delicate workpieces.

These and other features and advantages of the invention will be better understood with consideration of the following detailed description of the preferred embodiments taken in conjunction with the accompanying drawings.

The drawings are not to scale.

DETAILED DESCRIPTION OF THE PREFERRED EMBODIMENTS

Figure 1:
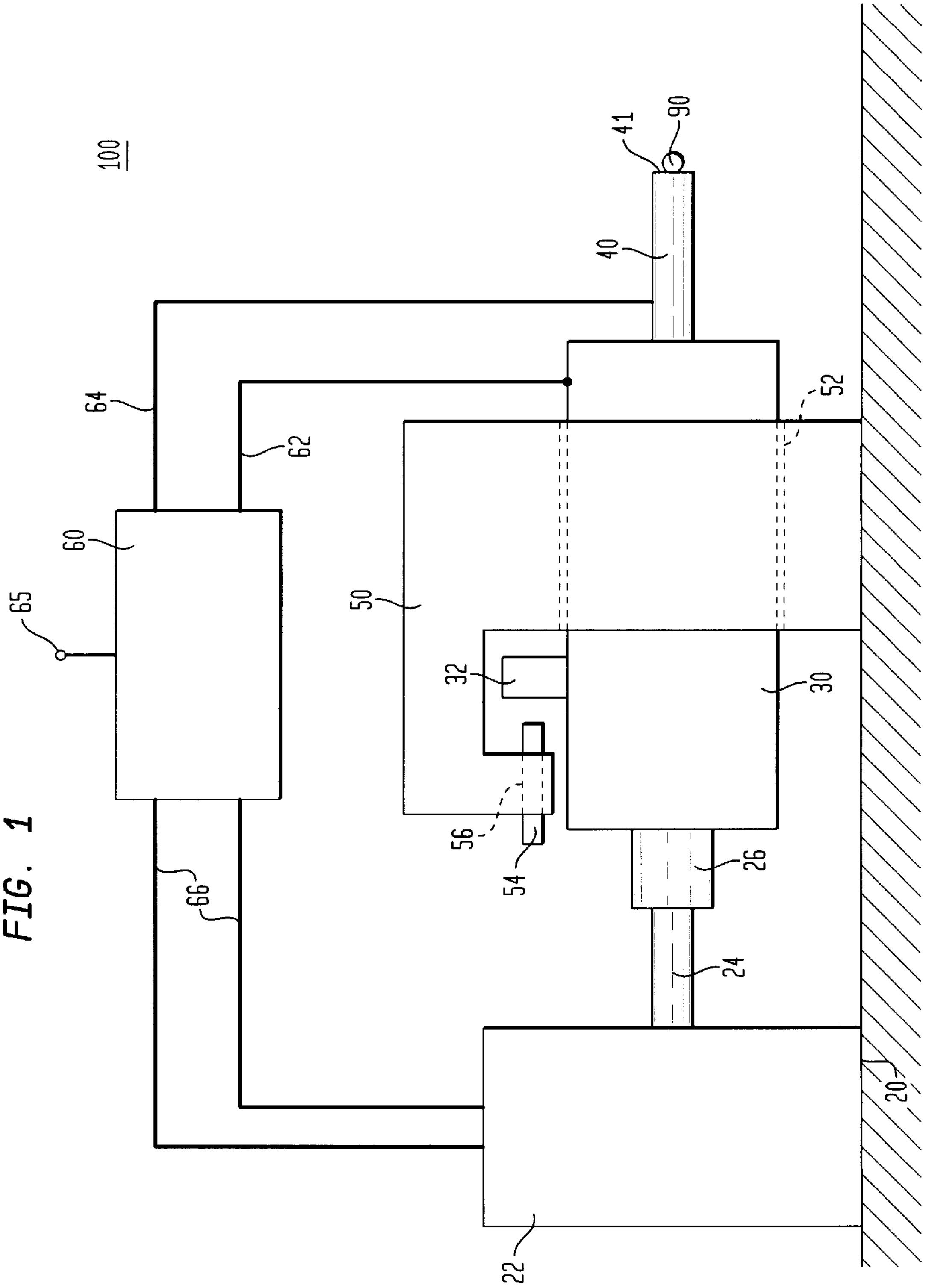
FIG. 1 is an outline drawing of one embodiment of the invention.

Referring now to FIG. 1, there is shown apparatus 100 in accordance with one embodiment of the invention wherein bidirectional linear actuator 22 and housing 50 are supported by support surface 20. The linear actuator drives shaft 24 in a reciprocal motion. Shaft 24, in turn, drives ram 30 via coupling 26 which interconnects the shaft and the ram. The ram is adapted to slide within surface 52 which is defined by the housing. A slide bearing (not shown) could be interspersed between the ram and the housing. The ram supports ram stop 32 which is a protrusion on the ram exterior. The function of the ram stop is to limit the reciprocal motion of the ram. This happens when the ram impinges upon the housing in the forward direction toward workpiece 90 in FIG. 1 (which limits the maximum force applied to the workpiece) and also when it impinges against stop adjustment 54 when moving in the backward direction. Stop adjustment 54 may be fixed in position or may be adjustable by turning it through threaded surface 56 which is defined by the housing. Plunger 40 emanates from ram 30 and is slidably supported by it so as to make contact with workpiece 90 at surface 41. Plunger 40 is adapted to be electrically isolated from ram 30 when a preset force by the workpiece against the plunger is exceeded. Wires 62 and 64 are adapted to sense an open or closed circuit between the ram and plunger and to furnish this information to controller 60. The controller is digitally programmable, receives instructions from input 65, and drives the linear actuator through wire set 66. The linear actuator comprises a stepper motor whose rotor is threaded to engage shaft 24 thereby converting digitally controlled rotational motion to reciprocal motion. The art of stepper motors is well known and linear actuators are commercially available with resolutions of one, two or four mils per step. One supplier of linear actuators is the Airpax Mechatronics Group, a division of Philips Technologies, Cheshire, Conn. Various models develop maximum forces from 16 to 45 ounces.

Figure 2:
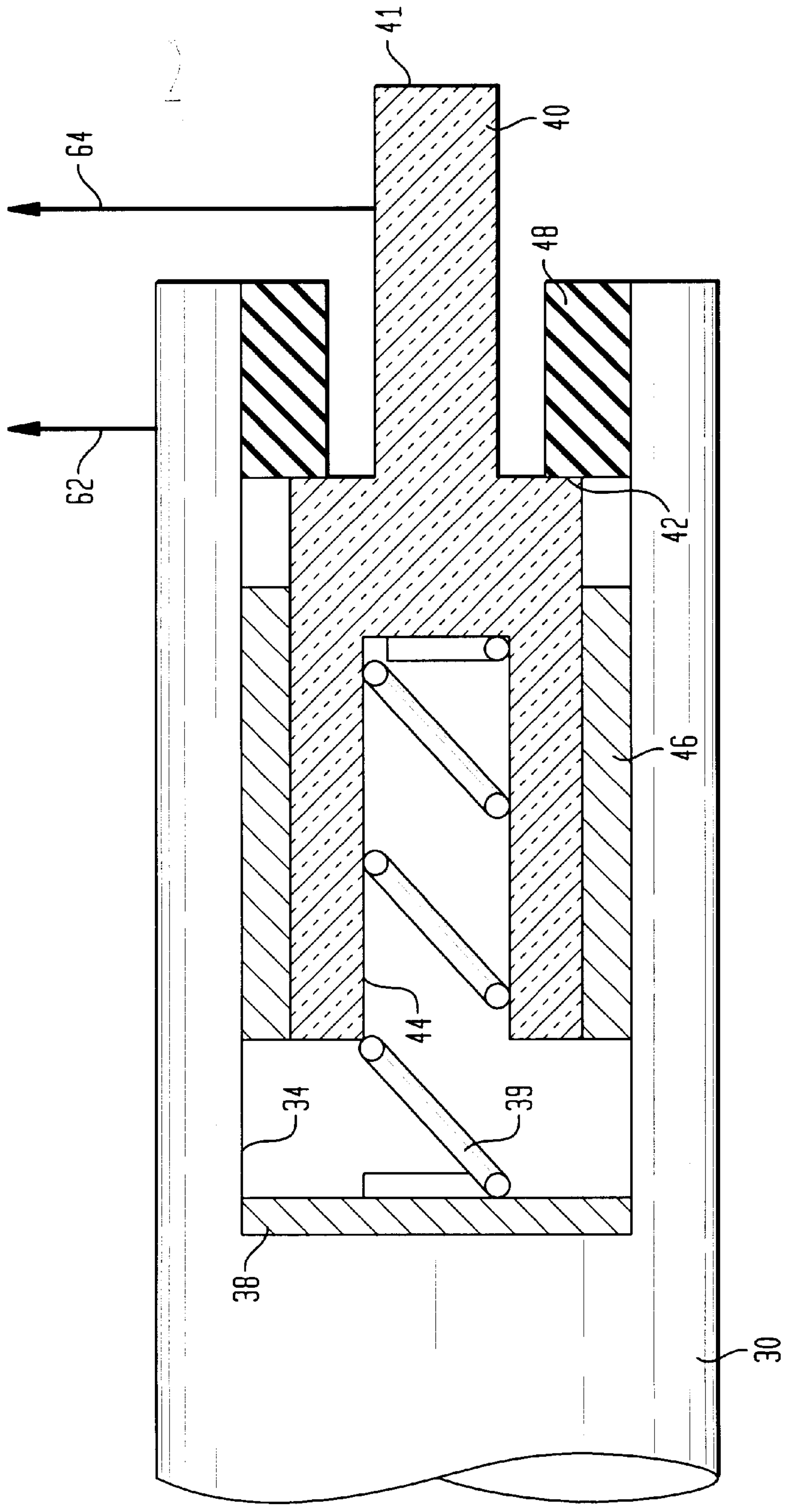
FIG. 2 is a sectional view of the same embodiment showing a plunger within a ram.

The configuration of plunger 40 and ram 30 is shown in greater detail in FIG. 2. Ram 30 defines ram aperture 34. Insulator 38 is adapted to fit within the ram aperture and electrically insulate the spring, hence plunger 40, from the ram. The insulator may be made from a ceramic or a plastic. Plunger 40 has an outer surface 41 which contacts the workpiece shown in FIG. 1. Plunger 40 also supports plunger contact 42 which may be made integrally with the plunger or may be an electrically conductive snap ring. Plunger 40 also defines plunger aperture 44 which is adapted to receive and constrain spring 39. Interspersed between the plunger and the ram is sliding sleeve 46 which is an electrical insulator such as plastic or ceramic and is attached to the plunger. Plunger stop 48 fits within ram aperture 34 and may be conveniently held in place by a thread, shrink fit, screw or by other common fastening means. The plunger stop is made of a conductive material and is electrically connected to the ram. Spring 39 is a common helical spring which acts to force plunger contact 42 against plunger stop 48 thereby creating a contact between wire 62 and wire 64 which are connected to the ram and plunger, respectively. The uncompressed length of spring 39, the distance between the insulator and the end of the plunger aperture, and the spring constant of the spring determine a preset load by which the plunger contact is forced against the plunger stop. The spring constant relates the force upon a spring to the distance it is compressed.

As the ram is advanced by the linear actuator along surface 52, surface 41 will eventually contact the workpiece. This amount of unimpeded travel can be varied to suit each application. As the ram continues to advance, the force by the workpiece against surface 41 continues to increase. When this force exceeds the preset load by an incremental amount, plunger contact 42 and plunger stop 48 separate and the plunger and sliding sleeve 46 move toward the insulator thereby compressing spring 39 beyond its preset load. As the plunger contact and the plunger stop separate, wires 62 and 64 sense an open circuit and feed this information back to controller 60 which may be programmed to continue the ram's advance toward the workpiece to apply a programmable amount of force in excess of the preset load. Since the linear actuator may be programmed in steps of approximately one mil, the translational step multiplied by the spring constant provides the resolution of the force applied to the workpiece. The controller may also be programmed to control the rate of advance of the ram toward the workpiece thereby controlling the impact of surface 41 against the workpiece. When the preset force is exceeded and wires 62 and 64 sense an open circuit, a different rate of advance may be programmed into the controller. A predetermined number of steps may also be programmed which corresponds to a compression of spring 39 to provide the specific force desired against the workpiece. When the clamping operation is complete, the controller reverses the linear actuator and shaft 24 withdraws the ram from the workpiece until the plunger contact and plunger stop make contact. At this point the clamping force is less than or equal to the initial spring preload value. This sends a closed circuit condition to the controller which may continue to withdraw the ram by a distance which is greater than the distance required to compress the workpiece to establish the preset load. At this point surface 41 disengages from the workpiece.

In the foregoing discussion the force against the workpiece was limited by the number of steps the controller applied to the linear actuator after the transition from a closed to an open circuit between wires 62 and 64. The translation of the ram relative to the housing may be mechanically limited by ram stop 32. If there is a programming or controller error whereby the linear actuator continues to drive the ram, the mechanical restraint provided by ram stop 32 will cause the ram to "stall", thus limiting the maximum spring controlled load imparted to the workpiece. The stop must engage prior to spring 39 bottoming out.

Figure 3:
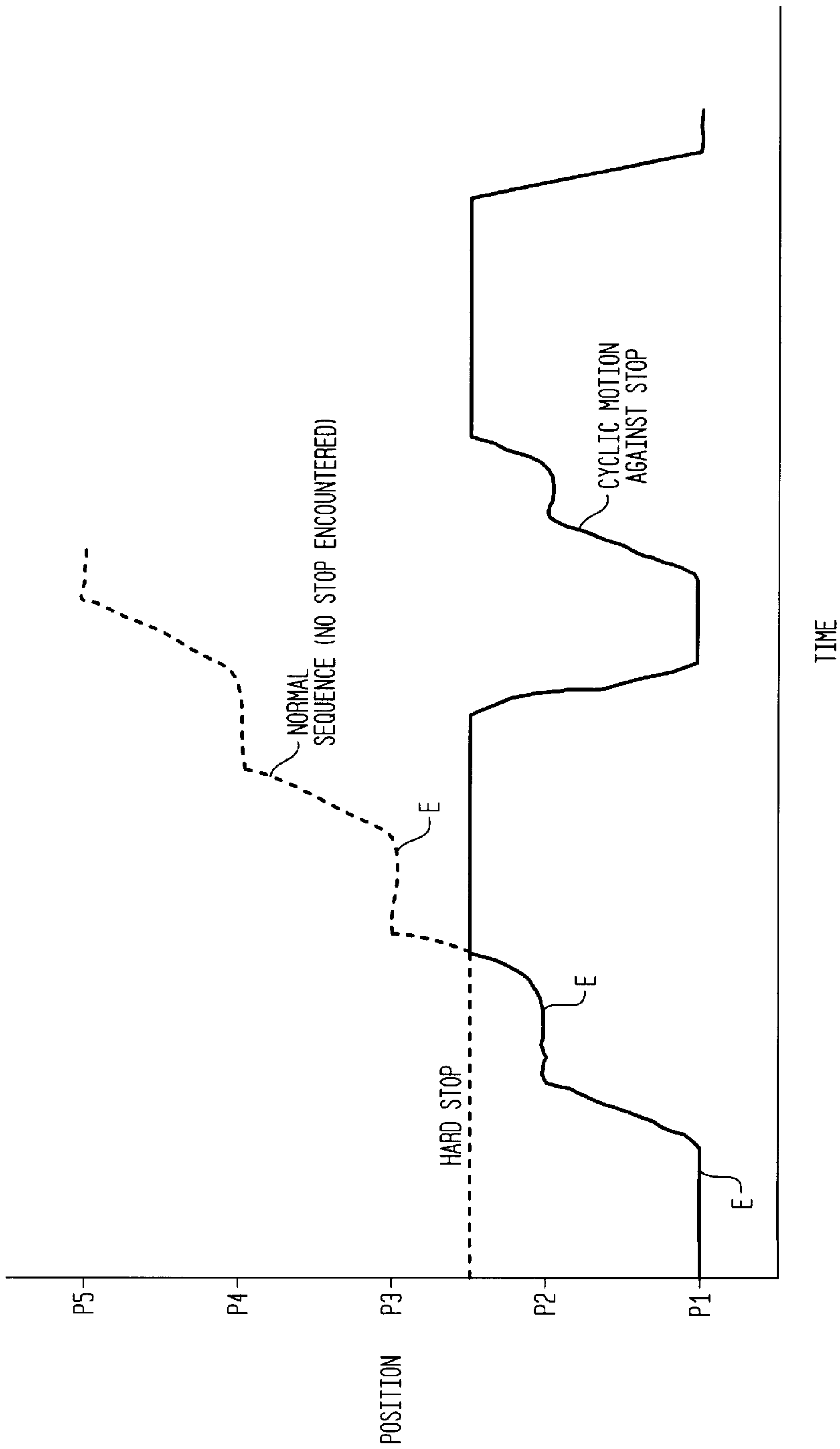
FIG. 3 is a graph of ram position versus time when the ram hits a hard mechanical stop.

A typical displacement versus time characteristic for a stepper motor is shown in FIG. 3. A stepper motor is a synchronous motor with direct current applied to the windings. FIG. 3 shows several null torque equilibrium positions ($P_1$–$P_5$) for a four winding stepper motor. When a hard stop is hit and additional stop commands are given, the motor and ram cycle back to previous null positions causing the ram to oscillate against the stop.

Figure 4:
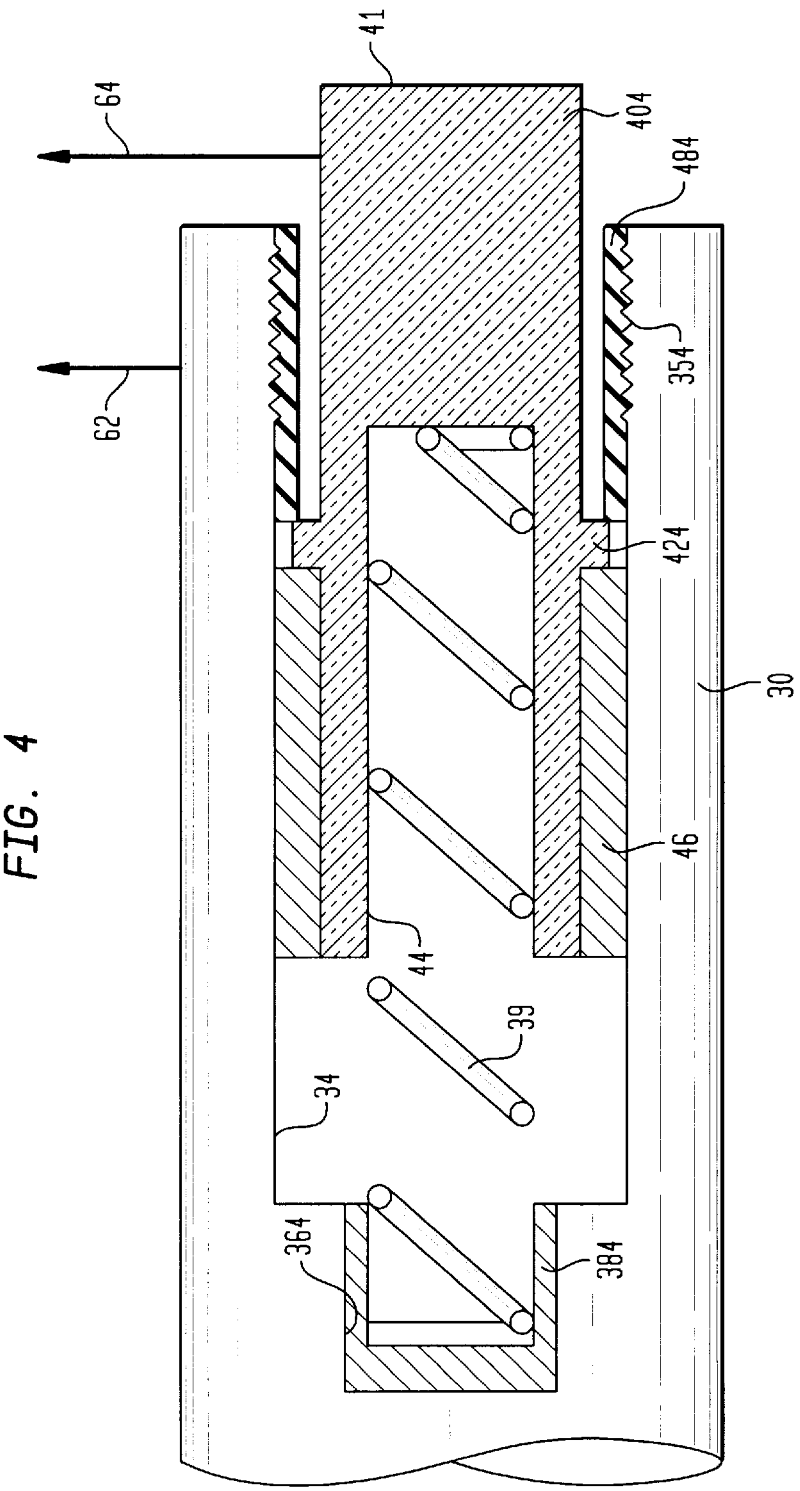
FIG. 4 is a sectional view of another embodiment of the invention.

Referring now to FIG. 4 there is shown an alternative arrangement of the elements described in FIG. 2. The differences being that ram 30 defines cup aperture 364 which supports an insulating retainer 384. Plunger 404 incorporates plunger contact 424 which may be a snap ring or it may be machined as an integral part of the plunger. Plunger stop 484 is shown as an element threaded into the ram. These variations provide the same function as the elements in FIG. 2 and may be employed in any embodiment of the invention.

Figure 5:
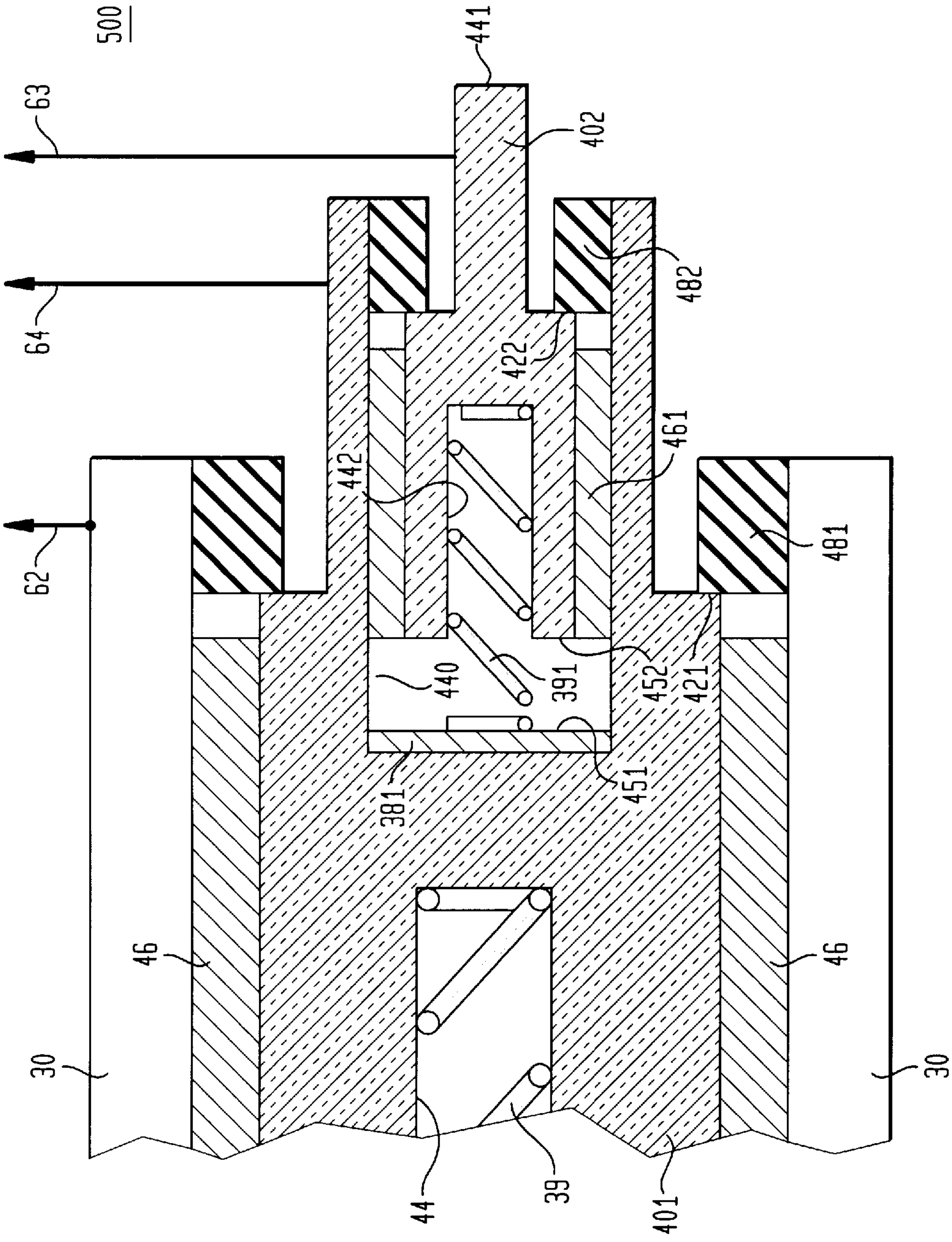
FIG. 5 is a sectional view of a further embodiment of the invention.

Referring now to FIG. 5 there is shown apparatus 500 which embodies the concept of a plunger within a plunger and of two springs (with likely different spring constants) in series with each other. The elements which bear the same numbers as the elements in FIG. 2 serve the same function. Ram 30, sliding sleeve 46, wire 62 and spring 39 are the same as in FIG. 2. First plunger 401 shows a first plunger contact 421 and first plunger stop 481 is attached to the ram by a press fit or any other conventional means. Additionally, first plunger 401 defines second plunger aperture 440. Second insulator 381 fits within the second plunger aperture and is made of an electrically insulating material. Second spring 391 fits within third plunger aperture 442 to bias second plunger contact 422 against second plunger stop 482. Wires 63 and 64 sense contact between second plunger contact 422 and second plunger stop 482, and wires 62 and 64 sense contact between first plunger contact 421 and first plunger stop 481. Surface 411 is designated to contact the workpiece to be clamped. The ram, under the direction of controller 60 of FIG. 1 advances apparatus 500 against the workpiece until a force is exerted by the workpiece against surface 411 which exceeds a preset force, F2, exerted by second spring 391 by an incremental amount. Wires 63 and 64 then sense an open circuit condition and feed this information back to the controller. Second spring 391 exerts a typically smaller load than will first spring 39, and usually has a spring constant less than that of first spring 39. Second spring 391 may continue to compress as the ram advances until surface 452 of second plunger 402 contacts surface 451 of first plunger 421. At this point, any further load increases due to are applied ram advance directly upon first spring 39 until its preset force F1 is exceeded by an incremental amount. Then wires 62 and 64 sense an open circuit condition and feed this information back to the controller. The design of spring 391 and the distance between surfaces 451 and 452 are such that the force exerted by spring 391 is less than the preset force F1 of first spring 39. With this condition, wires 63 and 64 will sense an open circuit before wires 62 and 64. The advantage of the series arrangement of springs with different preset loads is that very light loads can be applied to set a workpiece in place and then a larger load can be applied with less ram travel than if only one soft apring was used.

Figure 6:
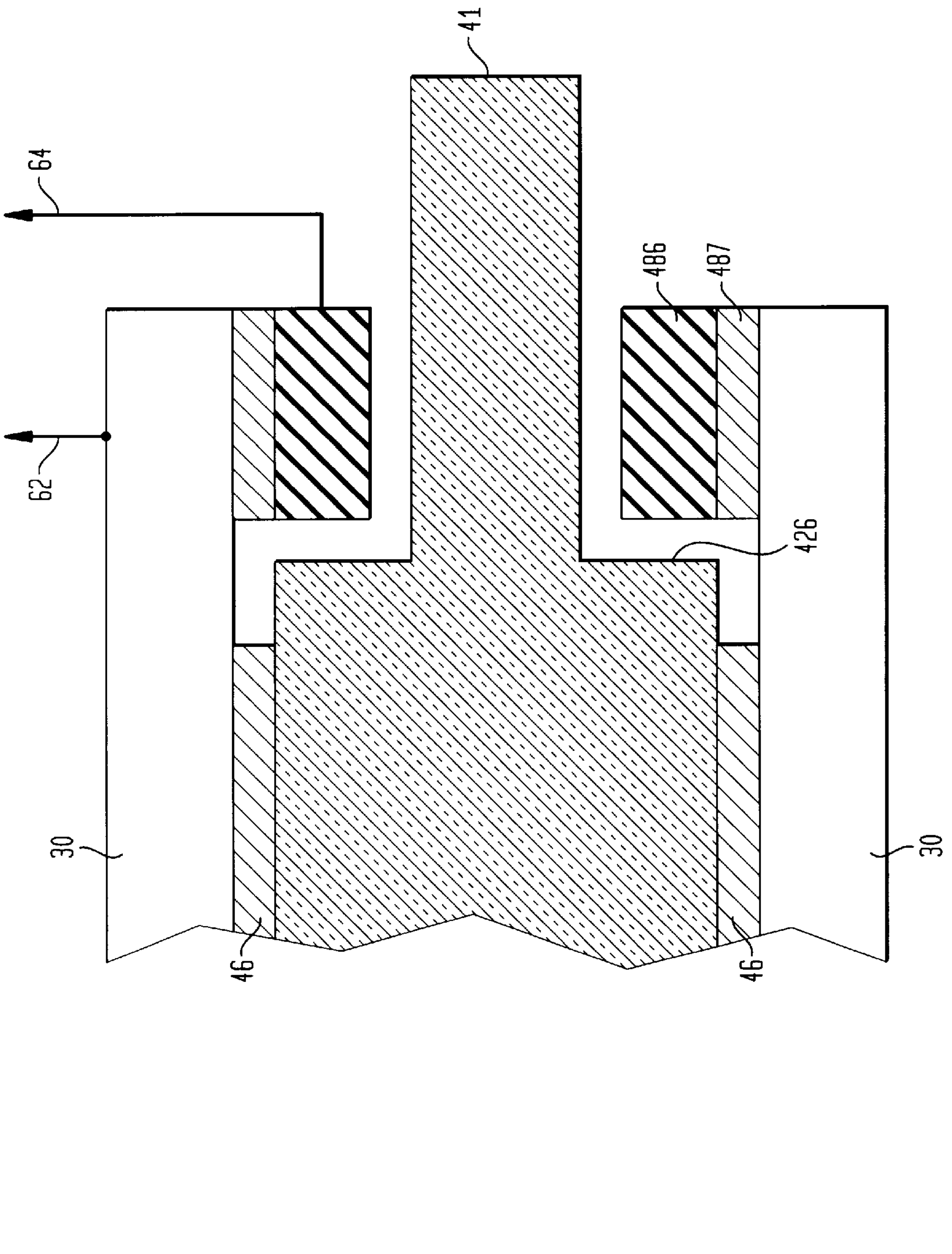
FIG. 6 is a sectional view of an alternate plunger stop and plunger contact arrangement.

Referring now to FIG. 6, there is shown an alternative way of mounting an electrically conductive plunger stop 486 which is supported by stop insulator 487 which insulates the plunger stop from ram 30. Wire 64 is connected to the plunger stop and wire 62 is connected to the ram. As the workpiece pushes against surface 41, plunger contact 426 is moved away from the plunger stop. FIG. 6 shows an open circuit condition which information is fed back to the controller by wires 62 and 64. The advantage of this plunger stop configuration is that wire 64 is not connected to the moving plunger. This variation may be applied to all the embodiments of the invention.

Changes and modifications in the specifically described embodiments can be carried out without departing from the scope of the invention. In particular, the position of the retainer may be reversed to cover the opposite end of the spring to insulate it from the plunger. The plunger contact may protrude above the outer surface of the plunger or it may simply be a step as shown in the various figures. The alternative plunger stop configuration may also be applied in any of the embodiments of the invention. A connection made through ground may be considered as a “wire”.

I claim:

1. A compound plunger for a clamping device comprising;

a first plunger, having a first sliding sleeve and a first plunger contact, the first sliding sleeve being an electrical insulator section adapted to slide within a ram aperture, the first plunger defining a first plunger aperture, and a second plunger aperture;

a first spring, whose diameter is adapted to fit within the first plunger aperture, applying a first preset force between the ram and the first plunger;

a first plunger stop, supported by the ram, adapted to make contact with the first plunger contact;

a second insulator, adapted to fit within the second plunger aperture;

a second plunger, having a second sliding sleeve and a second plunger contact, the second sliding sleeve being a second electrical insulator adapted to slide within the second plunger aperture of the first plunger, the second plunger defining a third plunger aperture;

a second spring, whose diameter is adapted to fit within the third plunger aperture, applying a second preset force between the second electrical insulator and the second plunger, the second preset force being less than the first preset force of the first spring; and a second plunger stop, supported by the first plunger, adapted to make contact with the second plunger contact.

2. The compound plunger of claim 1 further comprising;

a set of wires, the first wire being connected to the ram, the second wire being connected to the first plunger, and the third wire being connected to the second plunger, the first and second wires being adapted to sense contact between the ram and the first plunger contact, and the second and third wires being adapted to sense contact between the first plunger and the second plunger contact;

a housing defining a surface;

a ram, defining the ram aperture, slidably mounted within said surface;

a coupling supported by the ram;

a linear actuator having a shaft which is adapted for reciprocal motion and which is attached to the coupling;

an electrical insulator supported by the ram aperture; and a controller, adapted to receive signals from the set of wires and instruction signals from an input, provides output signals to drive the linear actuator.

3. The compound plunger of claim 1 further comprising;

a set of wires, the first wire being connected to the ram, the second wire being connected to the first plunger, and the third wire being connected to the second plunger, the first and second wires being adapted to sense contact between the ram and the first plunger contact, and the second and third wires being adapted to sense contact between the first plunger and the second plunger contact; and a controller, adapted to receive signals from the set of wires and instruction signals from an input, provides output signals to drive the linear actuator.

* * * * *